United States Patent [19]
Howard

[11] 3,768,870
[45] Oct. 30, 1973

[54] ELECTRICALLY ACTUATED TRAILER BRAKE CONTROL SYSTEM

[76] Inventor: Donald W. Howard, 401 N. Bendix Dr., South Bend, Ind. 46620

[22] Filed: Mar. 15, 1972

[21] Appl. No.: 234,746

[52] U.S. Cl............................ 303/7, 188/3 R, 303/20, 303/7, 20
[51] Int. Cl.............................................. B60t 13/68
[58] Field of Search.................................. 188/3 R

[56] References Cited
UNITED STATES PATENTS

| | | | |
|---|---|---|---|
| 3,659,903 | 5/1972 | Sarbach | 303/20 |
| 3,402,972 | 9/1968 | Cooper et al. | 303/20 |
| 3,507,542 | 4/1970 | Cannella | 188/3 R X |
| 3,656,817 | 4/1972 | Okamoto et al. | 303/20 X |
| 3,350,142 | 10/1967 | Schuman | 303/20 X |
| 3,574,414 | 4/1971 | Jacob | 188/3 R X |

Primary Examiner—Milton Buchler
Assistant Examiner—Stephen G. Kunin
Attorney—Ken C. Decker et al.

[57] ABSTRACT

Upon applying the brakes of a pulling vehicle, an electrical signal is used to actuate the trailer brakes. After applying the brakes of the pulling vehicle and the trailer, an electrical control system is used to control the trailer brakes hydraulic pressure as a function of the pulling vehicle's brake line pressure. As a pressure differential is detected between the pulling vehicle and the trailer, the electrical system decreases the trailer brake pressure until the differential no longer exists. The intelligence used to control the trailer brake hydraulic pressure is obtained from a pressure transducer in the brake line of the pulling vehicle, from a pressure transducer in the brake line of the trailer, and from the brake switch of the pulling vehicle. By inclusion of a proper feedback in the electrical control system, the pressure in the brake line of the trailer will not be changed by minor variations.

5 Claims, 2 Drawing Figures

Patented Oct. 30, 1973

3,768,870

ELECTRICALLY ACTUATED TRAILER BRAKE CONTROL SYSTEM

BACKGROUND OF THE INVENTION

This invention relates to a trailer brake control system. More particularly, the invention is directed to an electrically actuated trailer brake control system. The source of power for the trailer brake control system may be either a vacuum line from the pulling vehicle, an electric pump operated from the pulling vehicle's battery, or even a mechanical pump driven from the turning of the trailer wheels.

Previous to the present invention, there has been a problem with differences in brake torque developing between the trailer and the pulling vehicle. Unless the proper brake pressure is applied both to the pulling vehicle and to the trailer, problems can result. If the trailer brake pressure is too great, then the trailer will tend to drag the pulling vehicle to a stop upon application of the brakes. However, if the vehicle brake pressure is too great, the trailer will tend to run over the pulling vehicle while being braked to a stop.

Prior to the present invention, many trailers did not have any type of braking system whatsoever, especially among recreational vehicles. Many of these trailers depend entirely upon the braking ability of the pulling vehicle to stop both the pulling vehicle and the trailer. Other systems have been developed whereby brake line pressure from the pulling vehicle is fed back to the trailer. Still another system that is in more common usage is for a vacuum from the engine of the pulling vehicle to be fed back to the recreation type trailer. This vacuum pressure may be used to actuate a hydraulic braking system. Yet another popular system is the type which provides electrically actuated brakes on the trailer. These systems are actuated by the towing vehicle's electrical system when a brake actuation is effected. In recreational trailers the amount of money that can be spent on a braking system is much less than for the tractor-trailer vehicles. Therefore, any braking system must be as economical as possible and as reliable as possible to meet the budgets of the average owner.

SUMMARY OF THE INVENTION

Accordingly, it is an object of this invention to provide an electrically actuated vacuum powered, trailer brake control system.

It is a further object of the present invention to provide proportional brake pressure between the pulling vehicle and the trailer.

A still further object of this invention is to provide brake pressure for the trailer that can be varied according to the load of the trailer to provide a uniform braking force from the pulling vehicle and the trailer upon application of the vehicle brakes.

It is an even further object of the present invention to provide a solid state electrical control system for regulating the brake pressure of the trailer. The solid state electrical control system will have a feedback network to prevent responses to insignificant changes in brake pressure.

These and other objects are accomplished in the present invention in which pressure transducers monitor the brake line pressure of the pulling vehicle and the trailer. A comparison of the brake line pressure of the pulling vehicle and the trailer through a comparator network can give an output proportional to any given difference in brake pressure. This output can be used to regulate the brake pressure in the trailer. By regulating the brake pressure of the trailer, a uniform, smooth stop can be obtained upon application of the brakes of the pulling vehicle. As a source of power for applying the brakes of the trailer, a vacuum booster control from engine vacuum of the pulling vehicle may be used or any other conventional power source. Because most of the electrical control system can be implemented with a single integrated circuit chip, the present invention is more economical than any previously designed system to proportion the brake pressure of the pulling vehicle with the brake pressure of the trailer.

BRIEF DESCRIPTION OF THE DRAWINGS

The invention herein disclosed will be more fully understood when taken together with the accompanying drawings in which.

DESCRIPTION OF THE PREFERRED EMBODIMENTS

Figure 1:
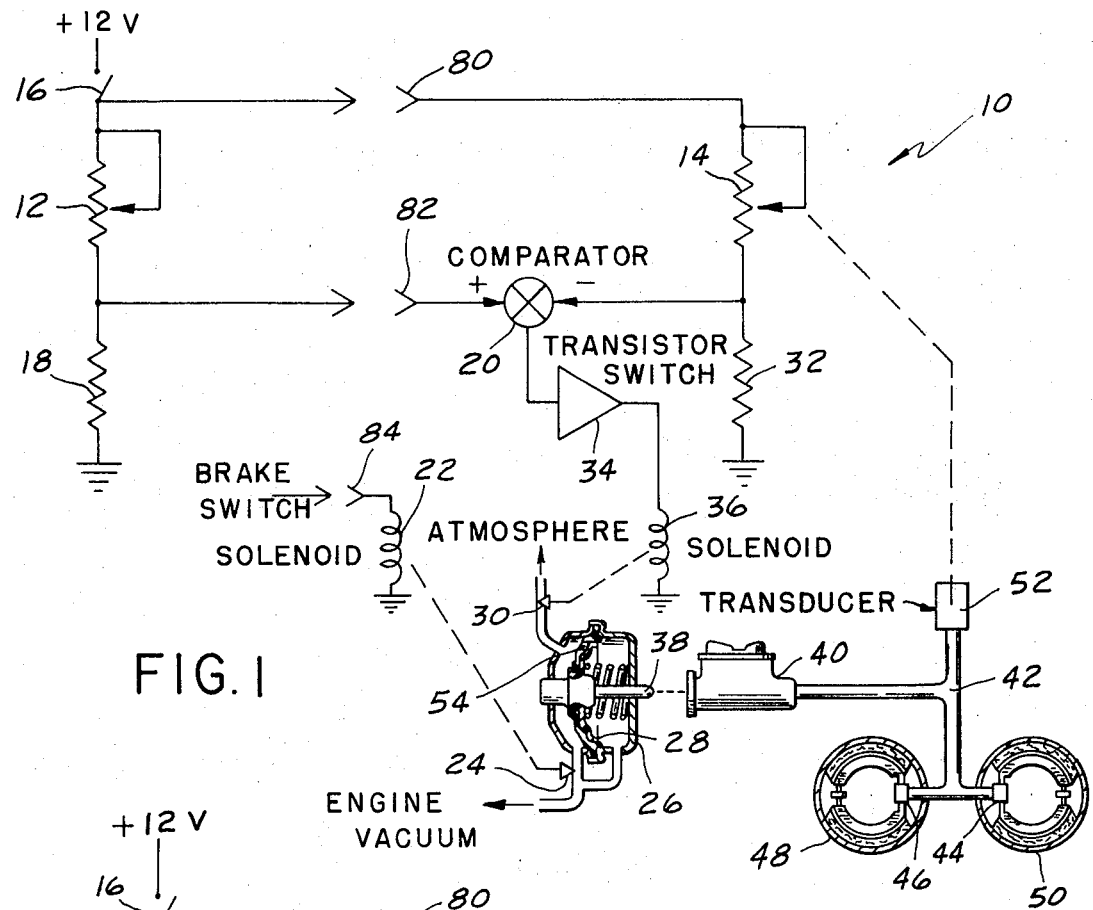
FIG. 1 is a functional diagram that shows the electrical control system and how it is used to control the power boost in a hydraulic brake system, the power boost being shown in a cross sectional view.

With continued reference to the accompanying figures, and with initial attention directed to FIG. 1, reference numeral 10 generally designates the electronic controls of the functional block diagram. A general presentation will be given first with more details given on the electronic controls 10 thereafter.

Transducers 12 and 14 are used to monitor the brake line pressure of the pulling vehicle and the trailer respectively. The transducers 12 and 14 are illustrated functionally as variable resistors. After turning on the ignition switch which closes contacts 16, essentially no current flows from the +12 volts to ground because the transducers 12 and 14 are of a very high resistance. Upon applying the brakes of the pulling vehicle, transducer 12 changes to a lower resistance, which allows current to flow through resistor 18. The current flowing through resistor 18 develops a voltage which is fed into comparator 20. Upon application of the brakes of the pulling vehicle, the brake switch closes which automatically energizes solenoid 22. The energization of solenoid 22 closes normally open valve 24.

The power booster 26 is vacuum operated from the engine vacuum. Before the closing of normally open valve 24, power booster 26 contains a diaphragm 28 that is suspended in a vacuum system. Before the application of the vehicle brakes, a normally closed valve 30 prevents atmospheric pressure from reaching the back side of diaphragm 28. Upon applying the brakes of the pulling vehicle and the development of voltage across resistor 18, a voltage is fed into comparator 20. Since transducer 14 is still at a high resistance value, very little voltage is developed across resistor 32. Since little current is flowing through resistor 32 and no voltage is being fed into comparator 20 from transducer 14, comparator 20 will give a voltage output which is subsequently fed into transistor switch 34. Transistor switch 34 is used to amplify the output of comparator 20 and energize solenoid 36. The energization of solenoid 36 will open normally closed valve 30. The time lag between the closing of normally open solenoid valve 24 and the opening of normally closed valve 30 is infinitesimal and will have essentially no result on the brake line pressure of the trailer.

The opening of normally closed valve 30 will allow pressure to develop on the back side of diaphragm 28. Since normally open valve 24 has isolated the back side of diaphragm 28 from the engine vacuum, the atmospheric pressure inside of power booster 26 will force diaphragm 28 and the power plunger 38 forward into the master cylinder 40. The master cylinder 40 may be either a single or a dual master cylinder or any other standard type. As a result of the force applied by the power plunger 38, the master cylinder 40 will put a pressure on the fluid in brake lines 42. The pressure in brake lines 42 will operate the brake cylinders 44 and 46 to apply the brakes 48 and 50. The transducer 52 represents the hydraulic connection of transducer 14.

Referring more specifically to the power booster 26, the diaphragm 28 has a slow bleed 54. Therefore, after the voltage developed across resistor 32 reaches essentially the same voltage as developed across resistor 18, both of which are fed into comparator 20, no output signal will result therefrom. Hence, the output of transistor switch 34 will drop to essentially zero thereby deenergizing solenoid 36 and closing normally closed valve 30. While both normally closed valve 30 and normally open valve 24 are closed, the slow bleed 54 allows a gradual reduction in atmospheric pressure on the back side of diaphragm 28. Hence, when the brake line pressure of the trailer falls below the brake line pressure of the pulling vehicle, comparator 20 will again have an output and transistor switch 34 will again energize solenoid 36. This will again allow the opening of normally closed valve 30 and again increase the fluid pressure applied through master cylinder 40 and brake lines 42 to the brake cylinders 44 and 46. By proper selection of the slow bleed 54 and the size of the booster 28, the cyclic rate of normally closed valve 30 can be kept very low. When the trailer brake pressure falls slightly below the brake pressure of the pulling vehicle, the normally closed valve 30 can be pulsed open for a short period of time and the brake pressure of the trailer will be increased at which time the normally closed valve 30 will again be deenergized.

Figure 2:
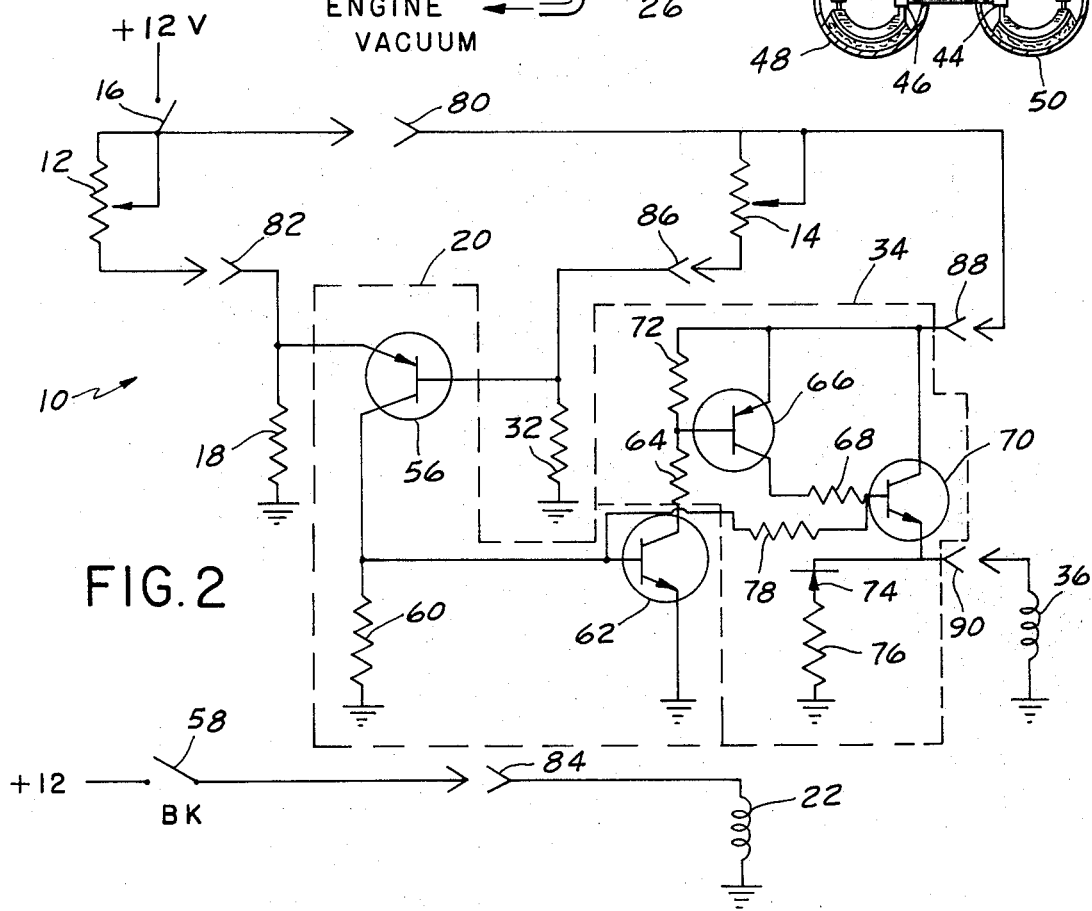
FIG. 2 is a detailed electrical schematic of the electrical controls shown in FIG. 1.

Referring now to FIG. 2 which shows the electronic controls of FIG. 1, like numerals will be used to designate the same parts. Prior to the brake application, both the emitter and collector of transistor 56 are at ground potential because essentially no current is flowing through resistor 18 because of the large resistance value of transducer 12. The solenoid 22 which is used to operate the normally open valve 24 is also deenergized because the brake switch 58 is open. Upon application of the vehicle brakes, the brake switch 58 is closed and the solenoid 22 is energized, thereby closing normally open valve 24. Because essentially no voltage is being developed across resistor 32, solenoid 36 will be energized, thereby opening normally closed valve 30. This is brought about by the electronic controls 10 as shown in more detail in FIG. 2.

The transistor 56 is turned on upon application of the vehicle brakes because the emitter voltage developed across resistor 18 is higher than the voltage developed across resistor 32 and connected to the base of transistor 56. The conduction of transistor 56 will develop a voltage across resistor 60, thereby causing the conduction of transistor 62. Transistor 62 which is a level detector will cause a current to flow through resistor 64 when conducting. The voltage developed across resistor 64 will cause the first stage of the transistor switch 34, which is transistor 66, to conduct. The conduction of transistor 66 will feed a current through resistor 68 into the base of transistor 70, thereby causing transistor 70 to conduct. The conduction of transistor 70 will cause current to flow through solenoid 36, and thereby, open normally closed valve 30. Resistor 72 is a normal bias resistor. Diode 74 and its series resistor 76 act as a damping network to protect the power transistor 70 when solenoid 36 is turned off.

As the brake pressure of the trailer increases and approaches the brake pressure of the pulling vehicle, the base voltage of transistor 56 approaches the emitter voltage. When these voltages are nearly equal, the comparator 20 and the subsequent transistor switch 34 are turned off, thereby deenergizing the solenoid 36 which prevents any further increase in pressure on the back side of diaphragm 28. The slow bleed 54 then allows the brake pressure of the trailer to slowly decay. By incorporation of a dead band within the control unit, which can be done by a large resistor 78, the range of slow pressure decay can be adjusted to provide a smooth control of brake pressure in the trailer in response to the brake pressure of the pulling vehicle.

As a further feature of the present invention, only three wires need be connected from the pulling vehicle to the trailer. Connectors 80, 82, and 84 represent the pin connections of these three wires that may be incorporated into a single cable connector. Furthermore, since the entire electronic controls 10, except for transducers 12 and 14, may be made from a single integrated circuit, the entire integrated circuit may be contained within the connector itself. Therefore, connectors 86, 88, and 90 may be pin connections within the cable connection and feed signals directly into an integrated circuit portion of the electronic controls 10. All of the integrated circuit could be contained within the cable connector.

By the inclusion of integrated circuits within the electronic controls of the present system, the cost of producing the present braking system may be kept to a minimum. This would make the present braking system very attractive for recreational type vehicles, especially camper trailers to be pulled behind normal family-owned vehicles. The only connections necessary between the pulling vehicle and the trailer would be a three-wire connector that anyone could very easily connect. If the power booster 26 is vacuum operated, then the only additional connection necessary would be to connect the engine vacuum from the pulling vehicle to the power booster 26. However, it is possible for the trailer brake system to have its own source of power or to be operated from a +12 volt pump driven by the battery of the pulling vehicle. Also, it is possible that the trailer may have a mechanical pump driven by the rotation of the wheels of the trailer. Whatever the source of power for the operation of the brakes of the trailer, it would take a minimum of cost to have the electrically actuated trailer brake control system as shown in the present invention. There is a tremendous need, especially in the recreational vehicles, for an economic system that will keep the brake pressure in the trailer proportional to the brake pressure in the pulling vehicle. Mechanical adjustments should be included in the transducers 12 and 14 to allow for differences in brake pressure of pulling vehicles and loads within the trailer. These mechanical adjustments could allow any trailer with any type of weight to be pulled by any vehicle that could pull the load, and still get a smooth, uniform stop. Both the trailer and the pulling vehicle would apply their proportionate share to the braking force.

I claim:

1. A means for controlling brake pressure of a towed vehicle as a function of brake pressure of a towing vehicle, said controlling means comprising:
a first means for monitoring brake pressure in said towing vehicle;
a second means for monitoring brake pressure in said towed vehicle;
means for comparing outputs from said first monitoring means and said second mointoring means, said comparing means having an output proportional to any difference between the brake pressures of said towing vehicle and said towed vehicle;
power means for applying the brakes of said towed vehicle when the brakes of said towing vehicle have been applied; and
means for varying said power means as a function of said proportional output of said comparing means, said varying means keeping brake pressure in said towed vehicle proportional to brake pressure in said towing vehicle,
said varying means comprising a switching means for operating a valving means from said proportional output, said valving means reducing force from said power means to the brakes of said towed vehicle,
said valving means providing a fast reduction in force from said power means, said power means comprising a means for slowly reducing the force from said power means to the brakes of said towed vehicle.

2. In a brake actuation system for actuating the brakes of a trailer in response to a brake actuation of the towing vehicle:
means for generating a first signal proportional to the braking pressure generated by the towing vehicle;
means for generating a second signal proportional to the braking pressure generated in the trailer;
means for comparing said first and second signals and generating a third signal when the first signal exceeds the second signal by a predetermined amount,
means for generating a fourth signal when the brakes of the towing vehicle are actuated,
means for generating braking pressure in said trailer including a housing, a diaphragm in said housing, means responsive to movement of said diaphragm for generating said trailer braking pressure, said diaphragm defining a pair of chambers between opposite sides of the diaphragm and corresponding ends of said housing, means normally communicating each of said chambers to a common pressure source, means responsive to said fourth signal for terminating communication between one of said chambers and said common pressure source, and means responsive to said third signal for initiating communication between said one chamber and another pressure source greater than the common pressure source whereby said diaphragm means is moved to generate trailer braking pressure.

3. The invention of claim 2,
said common pressure source being the engine manifold vacuum of the towing vehicle, said another pressure source being atmospheric pressure.

4. The invention of claim 3, and
a bleed orifice in said diaphragm to permit limited communication between said chambers, and resilient means yieldably urging said diaphragm means toward said one chamber, whereby said trailer braking pressure is gradually reduced during generation of said fourth signal when said third signal is not generated.

5. The invention of claim 3; and
means within said braking pressure generator means to gradually reduce trailer braking pressure during generation of said fourth signal when said third signal is not generated.

* * * * *